(12) United States Patent
Ramesh et al.

(10) Patent No.: US 6,801,931 B1
(45) Date of Patent: Oct. 5, 2004

(54) SYSTEM AND METHOD FOR PERSONALIZING ELECTRONIC MAIL MESSAGES BY RENDERING THE MESSAGES IN THE VOICE OF A PREDETERMINED SPEAKER

(75) Inventors: Rajaram Ramesh, Cary, NC (US); Tripurasundari Ramesh, Cary, NC (US); Thomas M. Croft, Cary, NC (US)

(73) Assignee: Ericsson Inc., Research Triangle Park, NC (US)

(*) Notice: Subject to any disclaimer, the term of this patent is extended or adjusted under 35 U.S.C. 154(b) by 529 days.

(21) Appl. No.: 09/619,971

(22) Filed: Jul. 20, 2000

(51) Int. Cl.[7] .............................................. G06F 15/16
(52) U.S. Cl. ........................ 709/206; 709/203; 704/9; 704/260
(58) Field of Search ................................ 709/203, 206; 704/9, 260; 379/88.02

(56) References Cited

U.S. PATENT DOCUMENTS

| | | | | |
|---|---|---|---|---|
| 5,970,453 A | * | 10/1999 | Sharman | 704/260 |
| 6,061,718 A | | 5/2000 | Nelson | |
| 6,289,085 B1 | * | 9/2001 | Miyashita et al. | 379/88.02 |
| 6,553,341 B1 | * | 4/2003 | Mullaly et al. | 704/9 |
| 6,557,026 B1 | * | 4/2003 | Stephens, Jr. | 709/203 |

FOREIGN PATENT DOCUMENTS

| | | |
|---|---|---|
| EP | 0901000 | 3/1999 |
| EP | 0969449 | 1/2000 |
| WO | WO9417518 | 8/1994 |

\* cited by examiner

Primary Examiner—Wen-Tai Lin
(74) Attorney, Agent, or Firm—Coats & Bennett, P.L.L.C.

(57) ABSTRACT

Electronic messages are personalized by rendering the messages to recipients in the voice of a predetermined human speaker. This is accomplished by associating with the message payload a set of basis vectors comprising speech parameters from the predetermined human speaker for use in speech synthesis.

20 Claims, 8 Drawing Sheets

SYSTEM AND METHOD FOR PERSONALIZING ELECTRONIC MAIL MESSAGES BY RENDERING THE MESSAGES IN THE VOICE OF A PREDETERMINED SPEAKER

BACKGROUND OF THE INVENTION

The present invention relates generally to the field of electronic messaging and, more particularly, to a system and method of personalizing received electronic messages through text-to-speech conversion. Electronic messaging, especially Internet e-mail using protocols such as Post Office Protocol (POP3) or Messaging Application Programming Interface (MAPI) has become extremely popular over the past several years. Besides being able to send plain text messages, users sending e-mail today are able to format messages in Hypertext Markup Language (HTML), attach practically any kind and number of supplementary documents or files, including images, executable programs, documents created by a word processor, sound files, video files, and many others. Attachments can be sent in compressed or uncompressed formats. The capability of sending audio files as e-mail attachments has led some users to use e-mail in a manner similar to voice mail.

BRIEF SUMMARY OF THE INVENTION

The present invention provides a system and method for personalizing electronic messages by rendering them to recipients in the voice of a predetermined human speaker. The invention may be implemented by associating with a message payload a set of basis vectors comprising speech parameters derived from the predetermined human speaker.

DETAILED DESCRIPTION OF THE INVENTION

Figure 1:
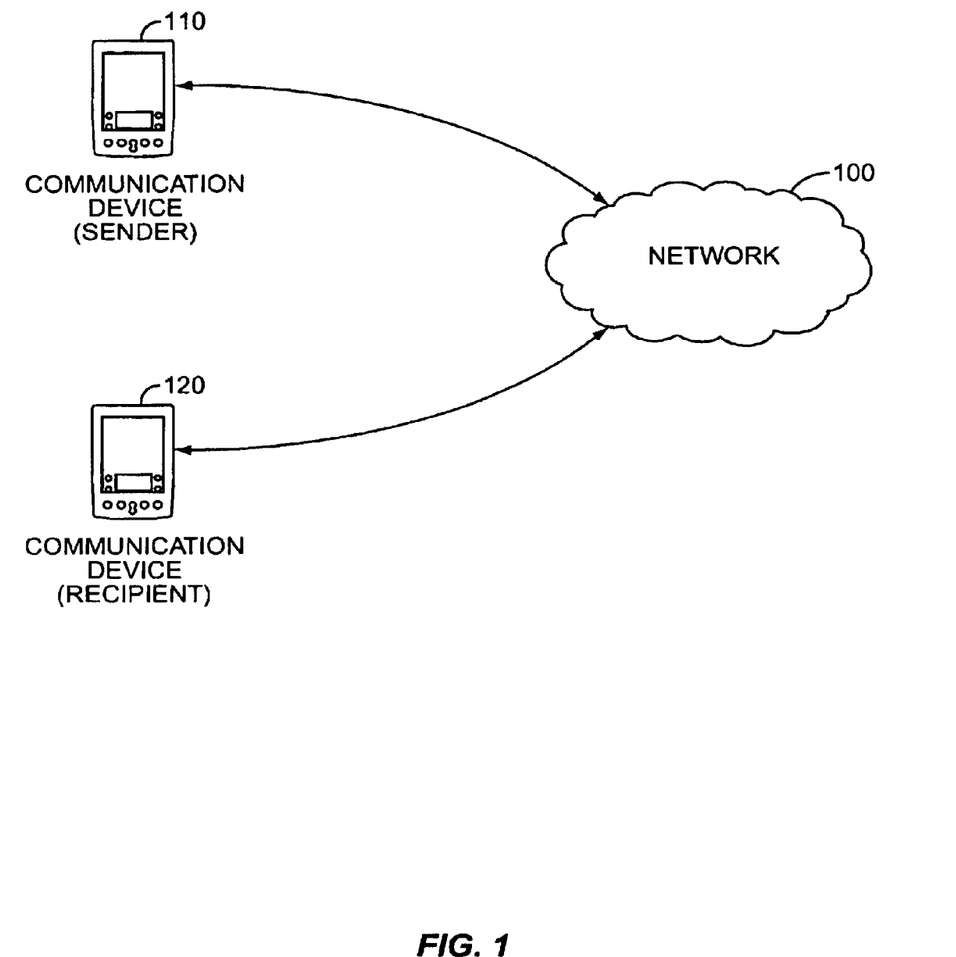
FIG. 1 is a circuit block diagram of an environment of the invention.

As illustrated in FIG. 1, the present invention will be described assuming that there is at least one human user communicating electronically over a communications network 100. Each user has some kind of communication device, 110 and 120 respectively, such as a desktop computer, laptop computer, palmtop computer, Personal Digital Assistant (PDA), cellular phone, PCS phone, cordless phone, satellite phone, or similar device. The term "electronic message" as used hereafter refers to a data object from a messaging protocol such as electronic mail or e-mail, Short Message Service (SMS), or other electronic messaging schemes.

Figure 2:
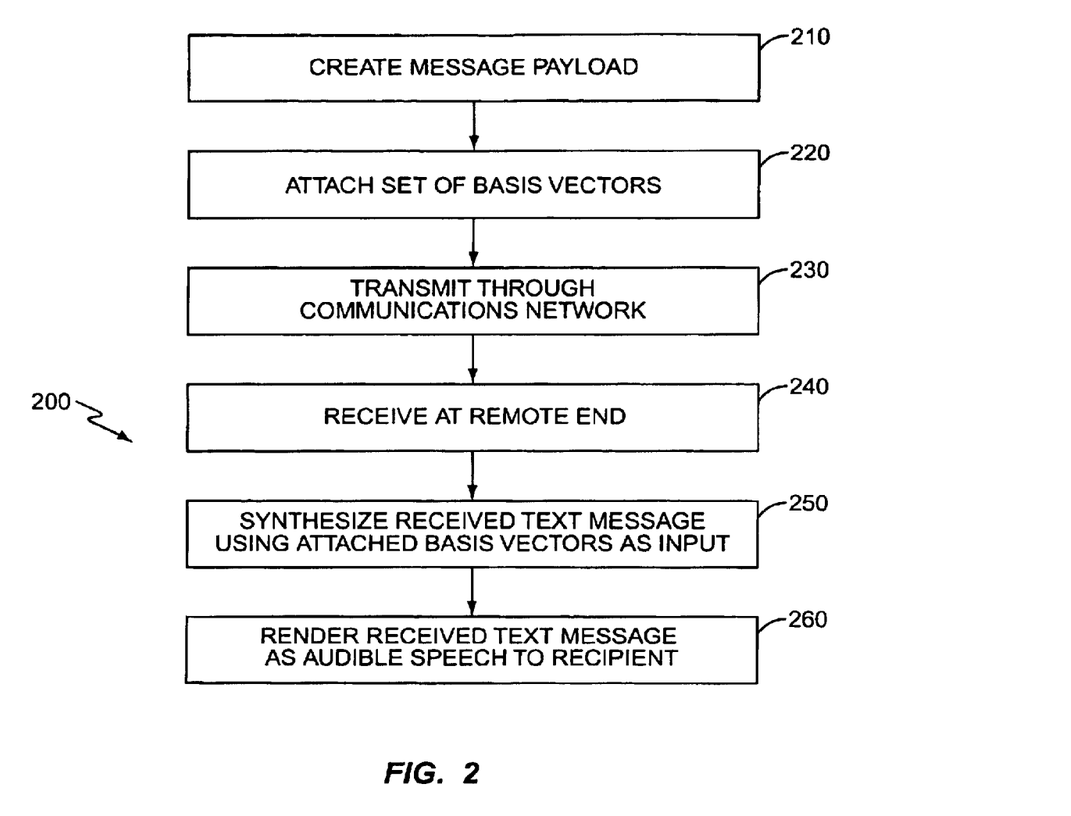
FIG. 2 is a flowchart illustrating the operation of one aspect of the invention.

Referring now to FIG. 2, a process 200 is illustrated. A message payload is created at 210, either automatically by a communication device or by a human sender using a communication device. The message payload may comprise simply text, or it may comprise a combination of a text message and one or more attached documents or files of various types (e.g., word processor files, image files, audio files, spreadsheets, executable programs, or others), some of which may also be, at least in part, text. In some instances, the message payload may comprise a null (blank) text message with one or more attachments. At 220, the set of basis vectors associated with a predetermined human speaker is additionally attached to the message payload, whether there are other attachments already present or not. The combined message payload and attached set of basis vectors, which may comprise the electronic message, are then transmitted through a communications network at 230. The electronic message is received at the remote end at 240. The recipient's communication device 120 processes the electronic message to separate the basis vectors from the message payload and, optionally, to synthesize as computer generated speech the text contained in the message payload, including the primary text message and any text attachments or text portions thereof, based on a voice model defined by the received set of basis vectors at 250. At 260, the recipient's communication device renders the text to the recipient as audible speech. One important application of the invention is allowing the recipient of an electronic message to hear the text portions thereof read in the voice of the sender. However, a sender may attach basis vectors corresponding to a speaker other than him or herself.

Figure 3:
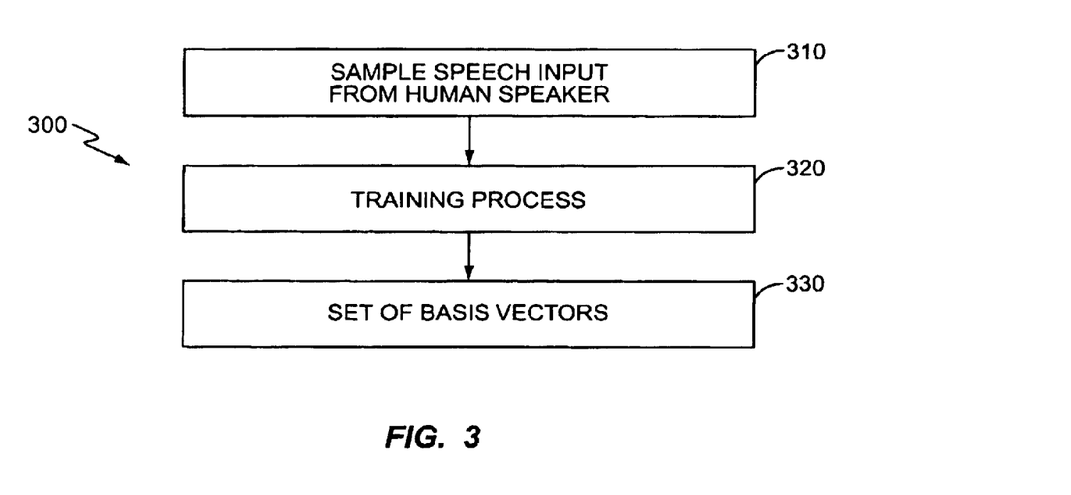
FIG. 3 is a simplified block diagram of a preliminary training process through which a set of basis vectors representing the speech parameters of a human speaker are derived.

FIG. 3 illustrates a preliminary training process 300 by which a set of parameters representing a specific human speaker may be derived for use in text-to-speech applications. The training process 300 is performed at least once for each human speaker whose speech parameters are to be used with the invention. At 310, sample speech from the desired speaker is input to a training algorithm 320, from which speech parameters such as Linear Predictive Coding (LPC) coefficients are produced as output at 330. With sufficient training, a particular speaker's voice can be modeled for text-to-speech applications using a relatively small amount of coefficient data compared to an actual audio recording of the speech. The speech parameters associated with a particular speaker will hereafter be referred to as "a set of basis vectors." Those skilled in the art will also realize that other methods of speech synthesis such as formant synthesis may also be used with the invention. Many speech analysis and synthesis methods can be used in the present invention as long as the speaker's voice may be modeled by a set of speech parameters that can be used subsequently to perform text-to-speech conversion.

Figure 4:
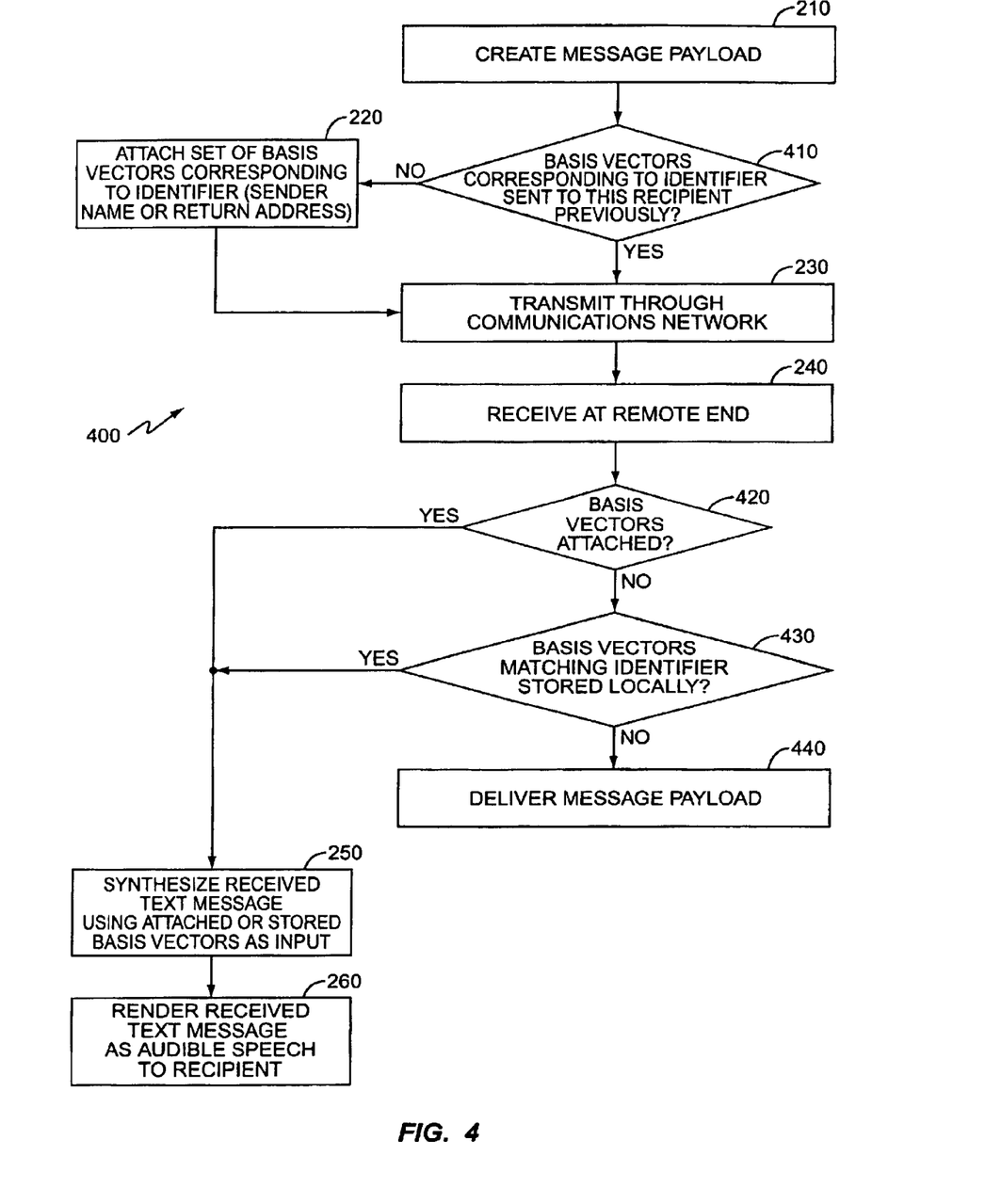
FIG. 4 is a flowchart illustrating the operation of yet another aspect of the invention.

FIG. 4 illustrates the operation of another process 400 to avoid unnecessarily sending the set of basis vectors, further saving network bandwidth. As shown in FIG. 4, the set of basis vectors is attached to the message payload by the sender's communication device only if it has not been sent previously 410 to a given recipient. The sender's communication device 110 maintains a record of which particular set of basis vectors has been sent to which recipients, and proceeds accordingly when new messages are created and sent. Those skilled in the relevant art are aware that it is easy to add such record keeping to the address book portion of an e-mail client software program, for example. If the specified set of basis vectors has already been sent, only the message payload is transmitted to the recipient. Otherwise, the set of basis vectors is attached and sent along with the message payload. In either case, the data object sent through the network by the sender is called the "electronic message." Upon receiving the electronic message, the recipient's communication device determines at 420 whether or not a set of basis vectors is attached. If so, any text portions of the message payload are, optionally, synthesized as speech (250 and 260) using the attached set of basis vectors as input to the speech synthesizer. If, however, a set of basis vectors is not attached, the recipient's communication device 120 examines an identifier within the message payload at 430. The identifier may comprise the electronic return address of the message payload (e.g., john.doe@internet.net), a domain name (e.g., "mynetwork.net"), an alias or nickname, an e-mail account user name (e.g., "john.doe85"), an IP address, or the name of a person from the "name" field in the message header (e.g., "John Doe"). Data elements such as the sender's name and return address may be automatically inserted in the message header by outgoing email protocols such as Simple Mail Transfer Protocol (SMTP). At 430, an attempt is made to match the identifier with a set of basis vectors stored at the recipient's communication device. If a match is found, processing proceeds to 250 and 260 to render the text as audible speech. If no match is found, the text payload is simply delivered to the recipient in the conventional fashion at 440. The recipient's communication device may select the appropriate set of basis vectors matching the identifier of the message payload from among a plurality of such sets of basis vectors, depending on from how many users the recipient has received such sets of basis vectors.

Figure 5:
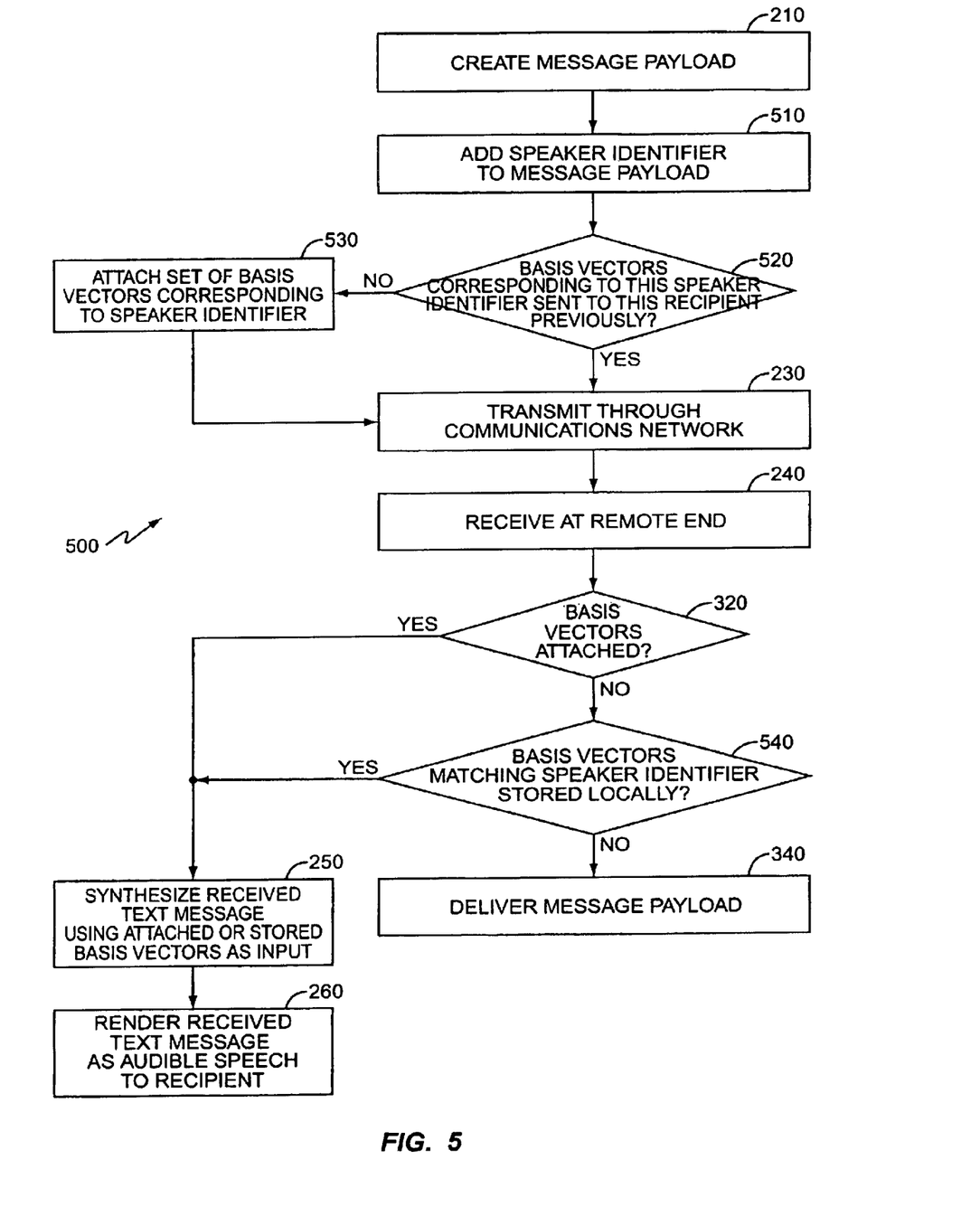
FIG. 5 is a flowchart illustrating the operation of a further aspect of the invention.

Referring now to FIG. 5, yet another process 500 is illustrated that provides greater flexibility in associating a set of basis vectors with the specific human speaker from which it was derived. In some cases, different individuals send e-mail messages from the same e-mail account, meaning the same return address and sender's name are associated with each sent message, regardless of who the actual sender was at the time. This is true if an entire family, for example, shares a single e-mail address. To differentiate the intended speaker from the sender of the message, a speaker identifier is added to the electronic message at 510. In one implementation, the speaker identifier may be added to the message header. The speaker identifier is an electronic label that corresponds to a specific set of basis vectors. In one implementation, it may correspond to the name of the speaker and comprise ASCII text added to the message header as a separate field. The speaker identifier tells the recipient's communication device 120 which set of stored basis vectors to associate with the received message payload when a set of basis vectors is not attached thereto, allowing multiple senders to share the same return address. At 520, the sender's communication device determines whether a set of basis vectors corresponding to the speaker identifier has been sent previously. If not, the appropriate set of basis vectors is attached at 530. If so, the message payload proceeds to the remote end (240) without an attached set of basis vectors. At 540, the recipient's communication device uses the included speaker identifier to associate a specific set of stored basis vectors with the message payload.

Process 500 thus enables, for example, a brother and sister to have sets of basis vectors corresponding to their respective voices stored on their grandmother's communication device from previous messages, to send new text messages to their grandmother without attaching the sets of basis vectors, and to share the same return e-mail address. When the grandmother receives a message from the granddaughter, for example, the grandmother's communication device automatically uses the granddaughter's speaker identifier included in the message payload to associate the granddaughter's pre-stored set of basis vectors with the message and to render the text portions as synthesized speech.

Figure 6:
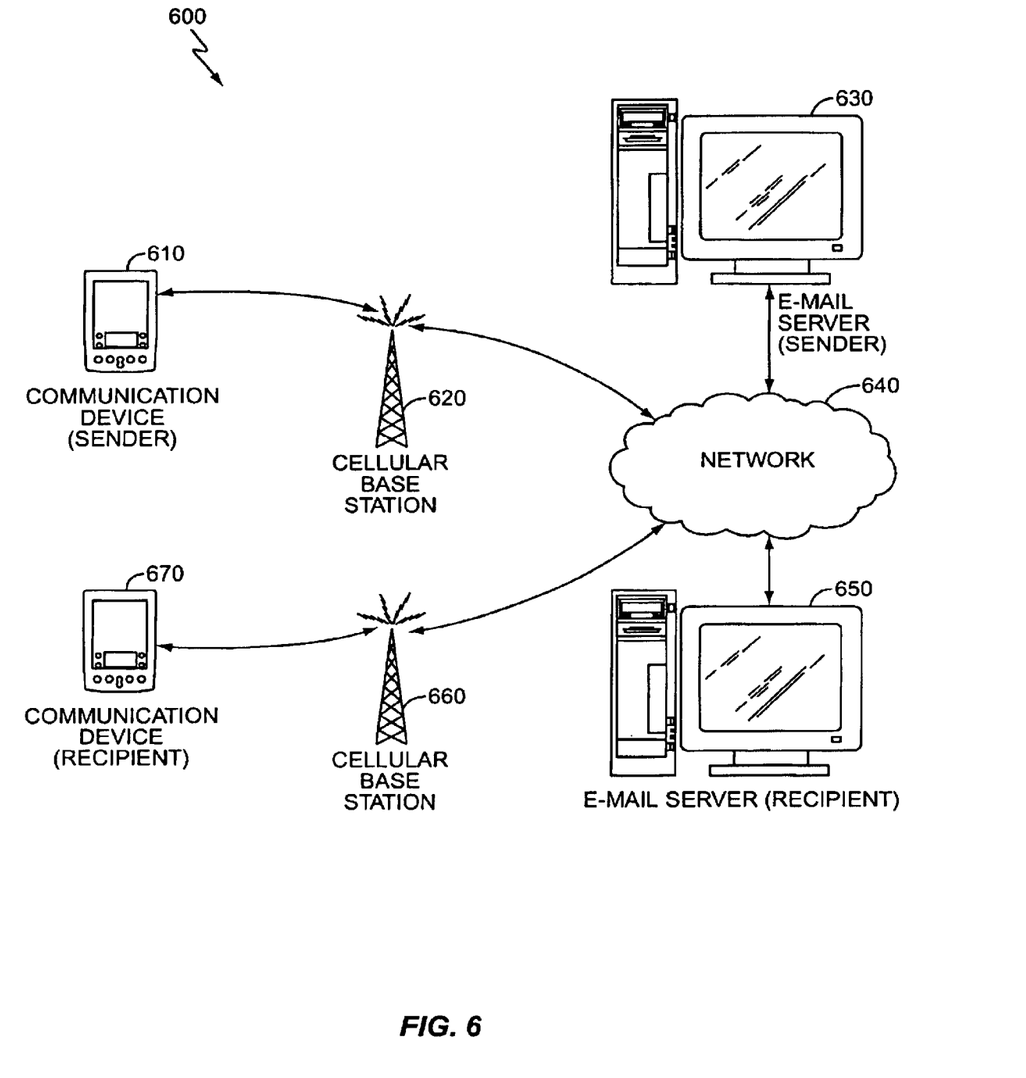
FIG. 6 is a circuit block diagram of an environment of the present invention.

Referring now to FIG. 6, an exemplary environment 600 is illustrated. In two embodiments assocated with the environment of FIG. 6, the invention makes use of one or more mail servers associated with the sender, the recipient, or both. The environment 600 comprises a sender communciation device 610, a cellular base station 620, an outgoing e-mail server 630, a communications network 640, an incoming e-mail server 650, a cellular base station 660 and a recipient communication device 670. The sender uses the communication device 610 to communicate with the communications network 640, such as the public switched telephone network (PSTN), via the cellular base station 620. An outgoing e-mail server 630 associated with the sender uses a protocol such as SMTP to send e-mail messages over the Internet, or any such network, to the recipient's incoming e-mail server 650. Those skilled in the art, however, will realize that the sender and receiver may share the same mail server so that, in reality, only one mail server may be involved. The recipient's incoming e-mail server 650 uses a protocol such as Post Office Protocol (POP3) to retrieve the received e-mail message and forward it to the recipient's communication device 670 via cellular base station 660.

Figure 7A:
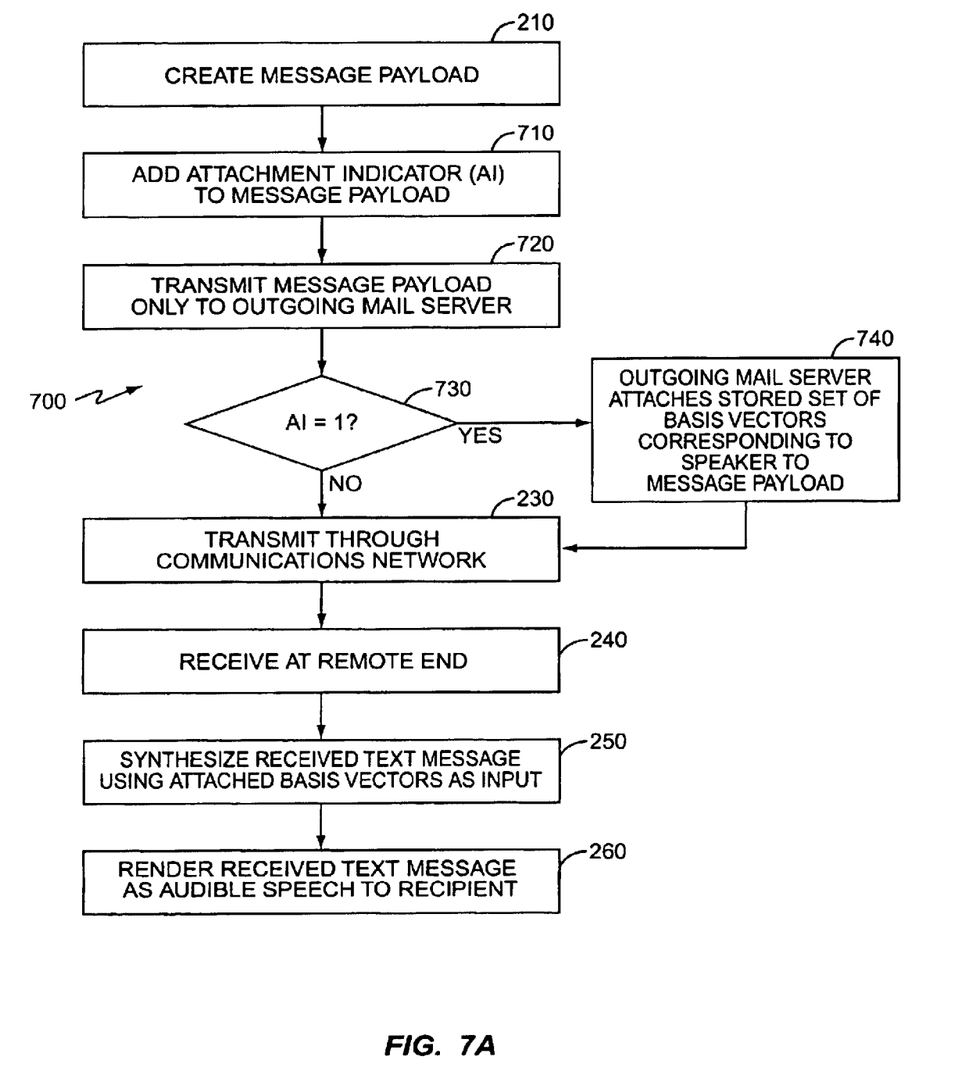
FIG. 7A is a flowchart illustrating the operation of the present invention within the environment shown in the circuit block diagram of FIG. 6.

Referring now to FIG. 7A, a process 700 operating within the environment shown in FIG. 6 is illustrated. While creating the message payload at 210, the sender has the option of specifying that a set of basis vectors corresponding to a chosen speaker be attached to the message payload at the sender's outgoing e-mail server 640. This is done by means of an attachment indicator (AI) added at 710 to the message payload, such as to the message header. In one implementation, the AI is simply a bit (or ASCII digit) equal to 1 if the set of basis vectors is to be attached and 0 if the set of basis vectors is not to be attached to the message. In either case, only the message payload is uploaded from the sender's communication device to the sender's outgoing e-mail server 640 at 720. When the message payload is received at mail server 640, the mail server 640 checks the status of the AI at 730. If the AI is asserted, the mail server 640 attaches the set of basis vectors specified by the identifier to the message payload and forwards the combined electronic message to the next network node. Processing then proceeds at the recipient's end as explained above. The sets of basis vectors are stored at the outgoing e-mail server 640, not in either the sender's or recipient's communication device. Optionally, the set of basis vectors may be stored along with the sender's account profile at mail server 640.

Figure 8A:
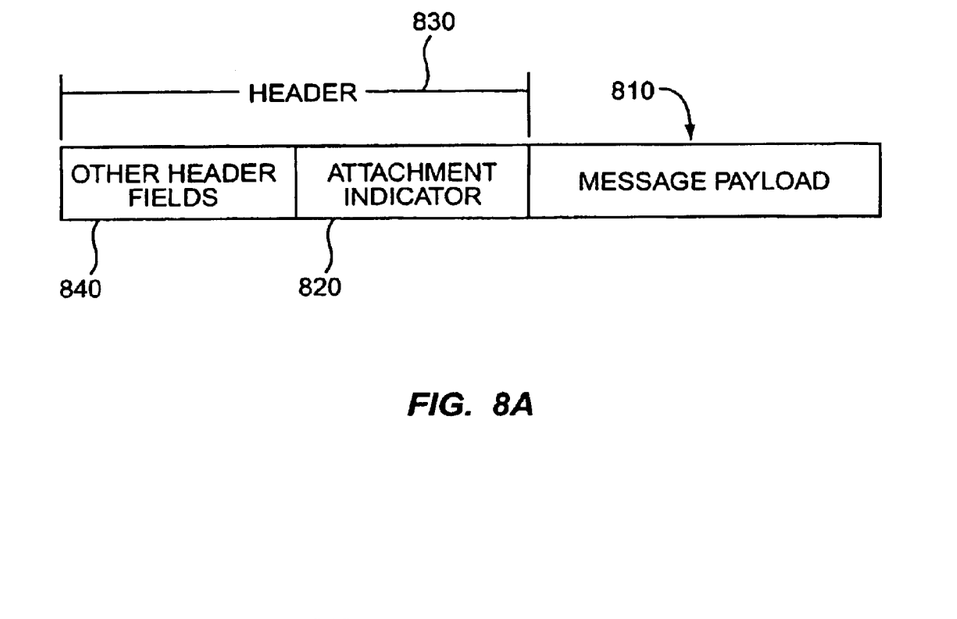
FIG. 8A illustrates the relationship between the message payload and the attachment indicator (AI) referenced in the flowchart of FIG. 7A.

FIG. 8A illustrates the relationship between the message payload and the AI. The message payload 810 contains the added AI 820, preferably in the header portion of the message 830, which contains other fields 840.

Figure 7B:
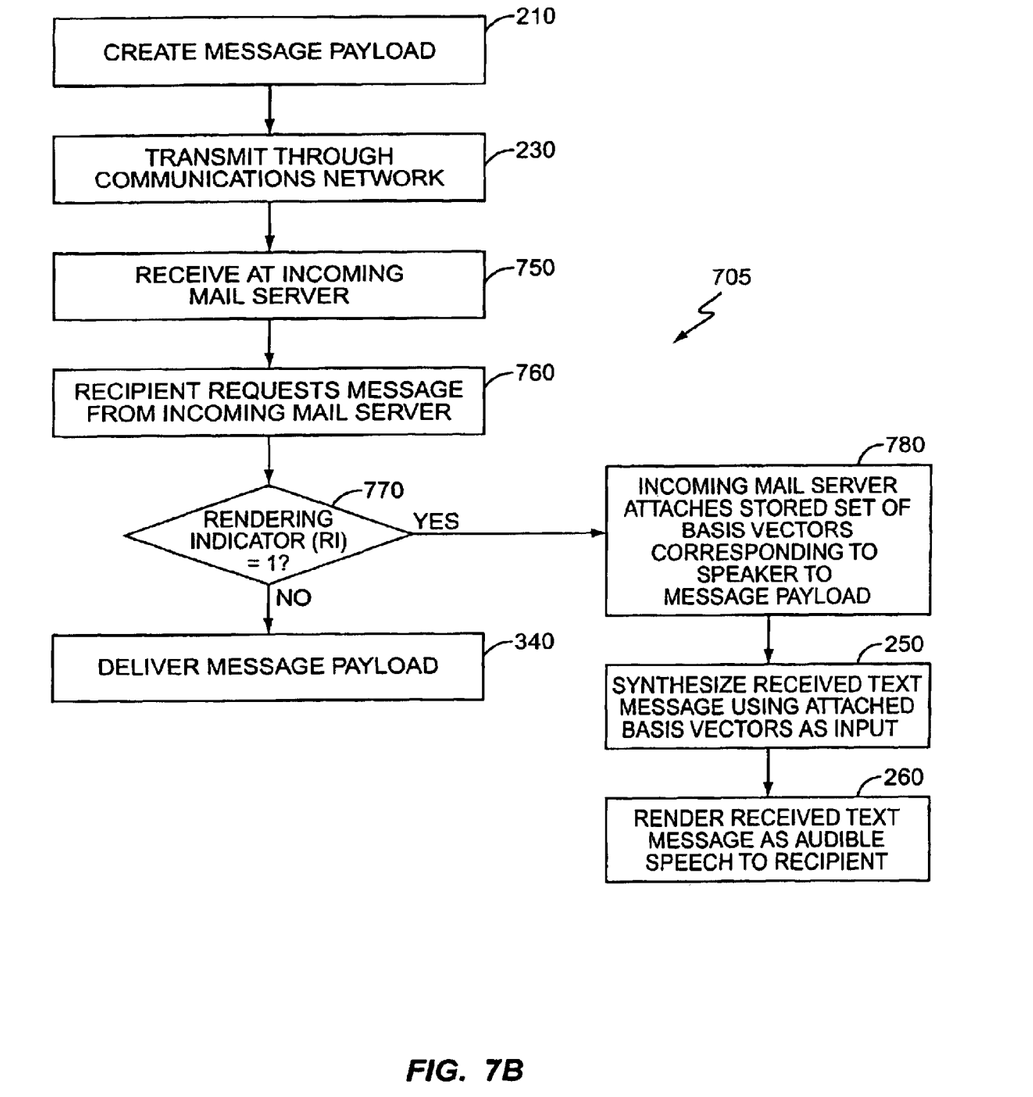
FIG. 7B is a flowchart illustrating the operation of another embodiment capable of operating within the environment shown in the circuit block diagram of FIG. 6.

Referring now to FIG. 7B, another process 705 operating within the environment shown in FIG. 6 is llustrated. It is assumed that the sender has not attached a set of basis vectors to the message payload. The message is subsequently received by the recipient's incoming e-mail server 650 at 750. The recipient, at 760, requests the message from the server 650. When the recipient sends the request to download new messages from mail server 650, the recipient also sets an optional rendering indicator (RI) within the message retrieval request. This data element is very similar to the AI explained previously and may be a bit or single ASCII digit that controls whether or not the incoming e-mail server 650 attaches a set of basis vectors for text-to-speech processing to the received message payload. If the RI is asserted at 770, the mail server 650 attaches the set of basis vectors indicated by the identifier included in the message payload at 780. The various sets of basis vectors corresponding to different speakers are stored at the incoming e-mail server 650 rather than being stored at either the sender's or the recipient's communication device. It will be appreciated by those skilled in the art that the processes 700, 705 support the sending of different sets of basis vectors corresponding to different speakers from a single e-mail address.

Figure 8B:
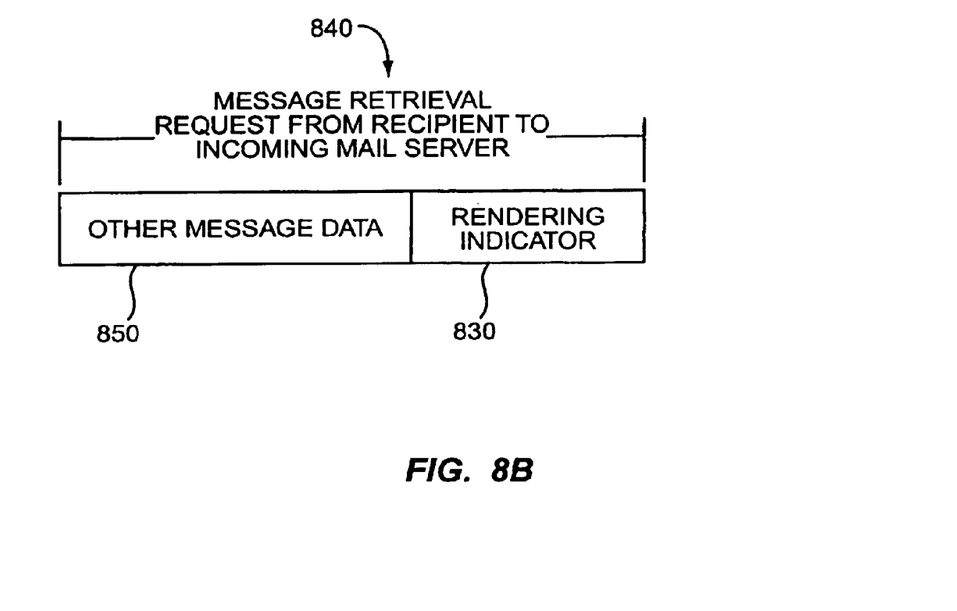
FIG. 8B illustrates the relationship between the recipient's message retrieval request and the rendering indicator (RI) referenced in the flowchart of FIG. 7B.

FIG. 8B illustrates the relationship between the message retrieval request and the RI. The RI 830 is included within the message retrieval request 840, which also contains other message data 850, at a suitable location.

It will be appreciated by those of ordinary skill in the art that the present invention can be embodied in other specific forms without departing from the spirit or essential character thereof. The presently disclosed embodiments are therefore considered in all respects to be illustrative and not restrictive.

What is claimed is:

1. A method of communicating an electronic message over a wireless communications network comprising:
    controlling, by a recipient's wireless communications device, whether a set of basis vectors is attached to the electronic message by transmitting a rendering indicator in a request message indicative of a request to download the electronic message with the set of basis vectors attached to the electronic message, wherein the set of basis vectors comprise speech parameters representative of the voice of a predetermined human speaker;
    receiving the electronic message and the set of basis vectors at said recipient's wireless communications device based on the value of the rendering indicator in the request message and a sender identity in the electronic message;
    extracting the set of basis vectors from the electronic message; and
    rendering the electronic message as audible speech at said recipient's wireless communications device using the set of basis vectors.

2. The method of claim 1 wherein rendering the electronic message as audible speech at the wireless communications device using the set of basis vectors comprises synthesizing a text portion of the electronic message as human speech using the set of basis vectors.

3. A method of communicating an electronic message over a wireless communications network comprising:
    receiving the electronic message at a network server;
    receiving, at the network server, a request message from a recipient's wireless communications device to download the electronic message, the request message comprising a rendering indicator indicating that an associated set of basis vectors should be attached to the electronic message;
    attaching the set of basis vectors to the electronic message based on the rendering indicator in the request message and a sender ID in the electronic message, the set of basis vectors comprising speech parameters representative of the voice of a predetermined human speaker; and
    forwarding the electronic message and the attached set of basis vectors to the wireless communications device.

4. The method of claim 3 further comprising receiving the electronic message and the attached set of basis vectors at the recipient's wireless communications device.

5. The method of claim 4 further comprising rendering the electronic message as synthesized audible speech at the recipient's wireless communications device using the set of basis vectors.

6. A wireless communications system comprising:
    first and second wireless communications devices;
    a set of basis vectors comprising speech parameters representative of a predetermined human speaker, the set of basis vectors stored in the first wireless communications device;
    wherein the first wireless communications device selectively associates the stored set of basis vectors with an electronic message to be transmitted to the second wireless communications device based on whether the second wireless communications device has previously received the set of basis vectors;
    wherein the second communications device transmits a request message comprising a rendering indicator to download the electronic message and the set of basis vectors; and
    wherein the set of basis vectors are attached to the electronic message based on the rendering indicator in the request message and a sender ID in the electronic message.

7. The system of claim 6 wherein the first wireless communications device attaches the set of basis vectors to the electronic message if the second wireless communications device has not previously received the set of basis vectors.

8. The system of claim 6 wherein the first wireless communications device attaches an attachment indicator to the electronic message and transmits the electronic message to the second wireless communications device.

9. The system of claim 8 wherein the set of basis vectors are attached to the electronic message based on the attachment indicator, and wherein the set of basis vectors are received at the second wireless device.

10. The system of claim 6 wherein the second wireless communications device extracts the set of basis vectors from the electronic message if the set of basis vectors are attached to the electronic message.

11. The system of claim 6 wherein the second communications device associates the electronic message with one of a plurality of sets of basis vectors stored on the second communications device if the set of basis vectors are not attached to the electronic message.

12. The system of claim 6 wherein the set of basis vectors are attached to the electronic message at a mail server based on the rendering indicator in the request message and the sender ID in the electronic message.

13. The system of claim 6 wherein the electronic message and the attached set of basis vectors are received at the second wireless device.

14. The system of claim 6 wherein the electronic message comprises an email message.

15. The system of claim 6 wherein the electronic message comprises a text message sent using a Short Message Service (SMS).

16. The system of claim 6 wherein at least one of the first and second wireless communications devices comprises a cellular phone.

17. The system of claim 6 wherein the first wireless communications device generates the set of basis vectors.

18. The system of claim 6 wherein the speech parameters are representative of the voice of the sender of the electronic message.

19. The system of claim 6 the first wireless communications device, stores the identities of one or more recipients that have previously received the set of basis vectors.

20. The system of claim 8 wherein the first wireless communications device adds the sender ID to the header of the electronic message that identifies the set of basis vectors.

* * * * *

UNITED STATES PATENT AND TRADEMARK OFFICE
CERTIFICATE OF CORRECTION

PATENT NO. : 6,801,931 B1
DATED : October 5, 2004
INVENTOR(S) : Ramesh et al.

It is certified that error appears in the above-identified patent and that said Letters Patent is hereby corrected as shown below:

Title page,
Item [54], Title, change from "SYSTEM AND METHOD OF PERSONALIZING ELECTRONIC MAIL MESSAGES BY RENDERING THE MESSAGES IN THE VOICE OF A PREDETERMINED SPEAKER" to -- SYSTEM AND METHOD OF PERSONALIZING ELECTRONIC MAIL MESSAGES --

Signed and Sealed this

Fifteenth Day of February, 2005

JON W. DUDAS
*Director of the United States Patent and Trademark Office*